(12) United States Patent
Katz et al.

(10) Patent No.: US 7,257,647 B2
(45) Date of Patent: Aug. 14, 2007

(54) DEVELOPMENT ENVIRONMENT PLATFORM USING MESSAGE TYPE MAPPING FOR CONVERTING MESSAGE AND PROVIDING INFORMATION BETWEEN SYSTEMS HAVING DIFFERENT DATA STRUCTURES

(75) Inventors: Ari Katz, Tel Aviv (IL); Daniel Mazor, Rechovot (IL); Yaki Haas, Tel Aviv (IL); Ariel Laub, Tel Aviv (IL); Gury Traub, Tel Aviv (IL)

(73) Assignee: SeaPass Solutions Inc., New York, NY (US)

( * ) Notice: Subject to any disclaimer, the term of this patent is extended or adjusted under 35 U.S.C. 154(b) by 883 days.

(21) Appl. No.: 10/376,505

(22) Filed: Mar. 3, 2003

(65) Prior Publication Data

US 2003/0233397 A1 Dec. 18, 2003

Related U.S. Application Data

(60) Provisional application No. 60/387,584, filed on Jun. 12, 2002.

(51) Int. Cl.
*G06F 15/16* (2006.01)
(52) U.S. Cl. ............ 709/246; 707/102; 707/100
(58) Field of Classification Search ............ 709/200, 709/203, 246; 707/3, 500, 104.1, 102, 100; 713/1; 705/22, 35, 4, 38, 1
See application file for complete search history.

(56) References Cited

U.S. PATENT DOCUMENTS

| | | | |
|---|---|---|---|
| 2001/0037287 A1* | 11/2001 | Broadbent et al. | 705/38 |
| 2002/0019788 A1* | 2/2002 | Stehle et al. | 705/35 |
| 2002/0040359 A1* | 4/2002 | Green et al. | 707/3 |
| 2002/0120473 A1* | 8/2002 | Wiggins et al. | 705/4 |
| 2002/0120685 A1* | 8/2002 | Srivastava et al. | 709/203 |
| 2002/0165872 A1* | 11/2002 | Meltzer et al. | 707/500 |
| 2002/0184237 A1* | 12/2002 | McFeely | 707/104.1 |
| 2002/0188513 A1* | 12/2002 | Gil et al. | 705/22 |
| 2003/0014270 A1* | 1/2003 | Qureshi et al. | 705/1 |
| 2003/0014617 A1* | 1/2003 | Tamboli et al. | 713/1 |
| 2003/0233397 A1* | 12/2003 | Katz et al. | 709/200 |

\* cited by examiner

*Primary Examiner*—Le Hien Luu

(57) ABSTRACT

A development environment develops a data transfer interface, which converts message traffic between a first data system and a second data system. The systems have a first and a second data structure respectively. The development environment consists of two structure modelers, one for each data system, and a matcher. The first structure modeler provides a model of the first data structure. The model is developed for each message type of a predetermined group of message types. The first structure modeler input consists of at least one sample message of each of the message types. The second structure modeler develops, from second system responses to test data, a second data structure model for each of the message types. The matcher supports matching of elements of the first structure model to corresponding elements of the second structure model, thereby forming a message type mapping.

45 Claims, 11 Drawing Sheets

DEVELOPMENT ENVIRONMENT PLATFORM USING MESSAGE TYPE MAPPING FOR CONVERTING MESSAGE AND PROVIDING INFORMATION BETWEEN SYSTEMS HAVING DIFFERENT DATA STRUCTURES

RELATIONSHIP TO EXISTING APPLICATIONS

The present application claims priority from U.S. Provisional Patent Application No. 60/387,584 filed Jun. 12, 2002, the contents of which are hereby incorporated by reference.

FIELD OF THE INVENTION

The present invention relates to information technology (IT) and more particularly but not exclusively to communication between IT systems.

BACKGROUND OF THE INVENTION

There are several global industries in which different parties in the industry must transfer information to one another. It is often the case that these parties use different IT systems, which where not designed to communicate with one another. These systems lack a standard interface and/or connectivity capabilities. Distribution of information between the parties is done primarily through mail, fax, phone, terminal emulation software, and web sites—an expensive and inefficient process. At many stages of the process, data must be manually re-keyed, reformulated, revalidated, or manipulated multiple times so that it can be processed by a variety of incompatible systems. The complexity, redundancy, and manual nature of the process means that errors may occur at multiple points, resulting in high costs and slow turnaround times.

There are currently two possible solutions to these difficulties. The first is to build a special purpose interface and/or to undergo integration projects, in order to modify the existing systems so that the systems are capable of communicating with each other. Integration projects between different systems are generally very expensive and time consuming, and require substantial cooperation from the different parties involved. Additionally, the result is tailored to specific systems. Adding a new system, or changing one of the existing systems, generally requires changing the communication interface, or performing additional modifications of the systems, in order to accommodate the new conditions.

The second method currently in use for resolving communication difficulties between systems is to define a communication standard. Systems complying with the standard are able to communicate with other systems employing this standard. However, adopting a new standard is ineffective unless all the different systems support the adopted standard. For industries that are very diverse, achieving a unified standard is almost impossible. Additionally, changing existing systems to comply with a new standard is very difficult. The changes required for each proprietary system are generally expensive and time consuming, especially for legacy systems.

The insurance industry is an example of an industry which suffers from inefficiency due to incompatible data formats of existing systems. Distribution of information between insurance industry members (for example communications between insurance companies and agencies) is currently done mostly by mail, fax, and telephone, a very expensive and inefficient process. Any information flow, such as policy submissions, endorsements, and policy information inquiries, requires entering the same information into several different systems. An agent often has to enter information once into the agency management system and then reenter the information into each carrier's terminal (or web site), or send it by mail to each carrier. When the information reaches its destination, the same information is entered again by each carrier into its own systems.

Insurance industry members are often reluctant to make significant changes to their existing systems due to the high costs of such projects, questionable return on investment (ROI), long implementation and integration periods and the retraining required to company employees. The insurance industry in the U.S. has been trying many years to create standard formats for collecting and transferring data through ACORD (the Association for Cooperative Operations Research and Development). However, adoption of the ACORD standard still requires making changes to existing systems, and enables communication only with other parties who have adopted the standard.

SUMMARY OF THE INVENTION

According to a first aspect of the present invention there is thus provided a development environment for developing a data transfer interface. The development environment converts message traffic between a sending data system, having a first data structure, and a receiving data system, having a second data structure. The development environment consists of a first structure modeler, a second structure modeler, and a matcher. The first structure modeler provides, a first data structure model for each of the message types, by analyzing at least one sample message of each of a predetermined group of message types. The second structure modeler develops a second data structure model for each of the message types, from responses by the second system to test data. The matcher supports the matching of elements of the first structure model to corresponding elements of the second structure model, thereby forming a message type mapping.

Preferably the second modeler incorporates handling capability for handling receiving system workflow into the second model.

Preferably the handling capability includes capability for handling cookie management.

Preferably the handling capability includes capability for handling form management.

Preferably the first structure modeler develops models in hierarchical form.

Preferably the second structure modeler develops models in hierarchical form.

Preferably the development environment further contains a message standardizer for converting sample messages into standardized messages having a standard structure associated with a respective message type.

Preferably the standard structure contains an extensible markup language (XML) structure.

Preferably the second data structure contains the standard structure and a receiving system specific structure.

Preferably the development environment further contains a mapping generator associated with the matcher, which generates a mapping for automatically converting a message having the first data structure into a message having the second data structure.

Preferably the mapping generator represents the mapping in a transformation language.

Preferably the transformation language contains cross-system rules and cross-system logic.

Preferably the mapping being in the transformation language is compilable to form an augmented Service Provider Extensions (SPX) file.

Preferably the development environment also contains a browser for displaying information received from the sending system to a user.

Preferably the information is displayed hierarchically.

Preferably the development environment also contains a second structure displayer, for displaying information expected by the receiving system for a selected message type.

Preferably the matcher also contains a user interface for displaying the first and second models, and enabling a user to perform the matching.

According to a second aspect of the present invention there is thus provided an interface for converting an initial data message from a sending system into a completed message destined for a receiving system. The initial data message is structured according to a first data structure, and the completed message has a receiving system specific second data structure. The interface contains a message analyzer which determines a message type of the initial message and selects an appropriate mapping. The mapping selected is specific to the message type of the initial message, and describes a transformation between the first structure and the second structure.

Preferably the message analyzer selects the mapping according to the sending and receiving systems.

Preferably the interface also contains a message restructurer, for restructuring the initial message to conform to the second data structure, in accordance with the mapping.

Preferably the interface also contains an information completer, for querying the sending system to provide information required by the second data structure and absent from the message.

Preferably the information completer contains a message inspector, for analyzing the initial message according to the mapping, so as to identify the absent information.

Preferably the interface also contains an information completer, for querying the sending system to provide information required by the second data structure and absent from the message.

Preferably the message restructurer is further operable to insert information obtained from the sending system into the restructured message.

Preferably the mapping is formulated as an augmented Service Provider Extensions (SPX) file.

Preferably the message analyzer is further operable to test message validity.

Preferably the interface also contains a structure standardizer for converting the initial data message into a standard structure data message.

Preferably the structure standardizer is further operable to verify that the standard structure data message complies with the standard.

Preferably the standard structure contains an XML structure.

Preferably the mapping further describes a transformation between the standard structure and the second data structure.

Preferably the message restructurer is operable to restructure the standard structure data message to conform to the second data structure.

Preferably the interface also contains an updater for analyzing receiving system responses to the completed message, detecting changes to the receiving system, and updating the mapping as required by the changes.

Preferably the interface also contains a forwarder, for forwarding the completed message to the receiving system.

Preferably the interface is further operable to convert receiving system messages from the second data structure to the first data structure.

Preferably the forwarder is further operable to forward receiving system messages to the sending system.

Preferably the forwarder is operable to select a gateway for outputting the message to a network.

Preferably the forwarder is operable to optimize gateway selection.

Preferably the interface is further operable to convert the initial data message to a completed message having a third data structure associated with a second receiving system.

Preferably the interface also contains an activity logger for recording interface activity in a log.

According to a third aspect of the present invention there is thus provided a method for converting an initial data message from a sending system, and having a first data structure, into a completed message having a receiving system specific second data structure. The method consists of the following steps. First the message type of the initial message is determined. Then an appropriate mapping is selected. The mapping is specific to the message type, and describes a transformation, between the first structure and the second structure; for the message type. Finally, the initial message is transformed into a message conforming to the second data structure, in accordance with the mapping.

Preferably the method contains the further steps of identifying information required by the second data structure and absent from the message, and querying the sending system to provide the absent information.

Preferably the method contains the further step of converting the initial data message into a standard structure data message.

Preferably the method contains the further steps of analyzing receiving system responses to the completed message, detecting changes to the receiving system, and updating the mapping as required by the changes.

Preferably the method contains the further step of comprising forwarding the completed message to the receiving system.

Preferably the method contains the further step of mapping receiving system messages from the second data structure to the first data structure.

Preferably the method contains the further step of forwarding receiving system messages to the sending system.

Preferably the method contains the further step of converting the initial data message to a completed message having a third data structure associated with a second receiving system.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
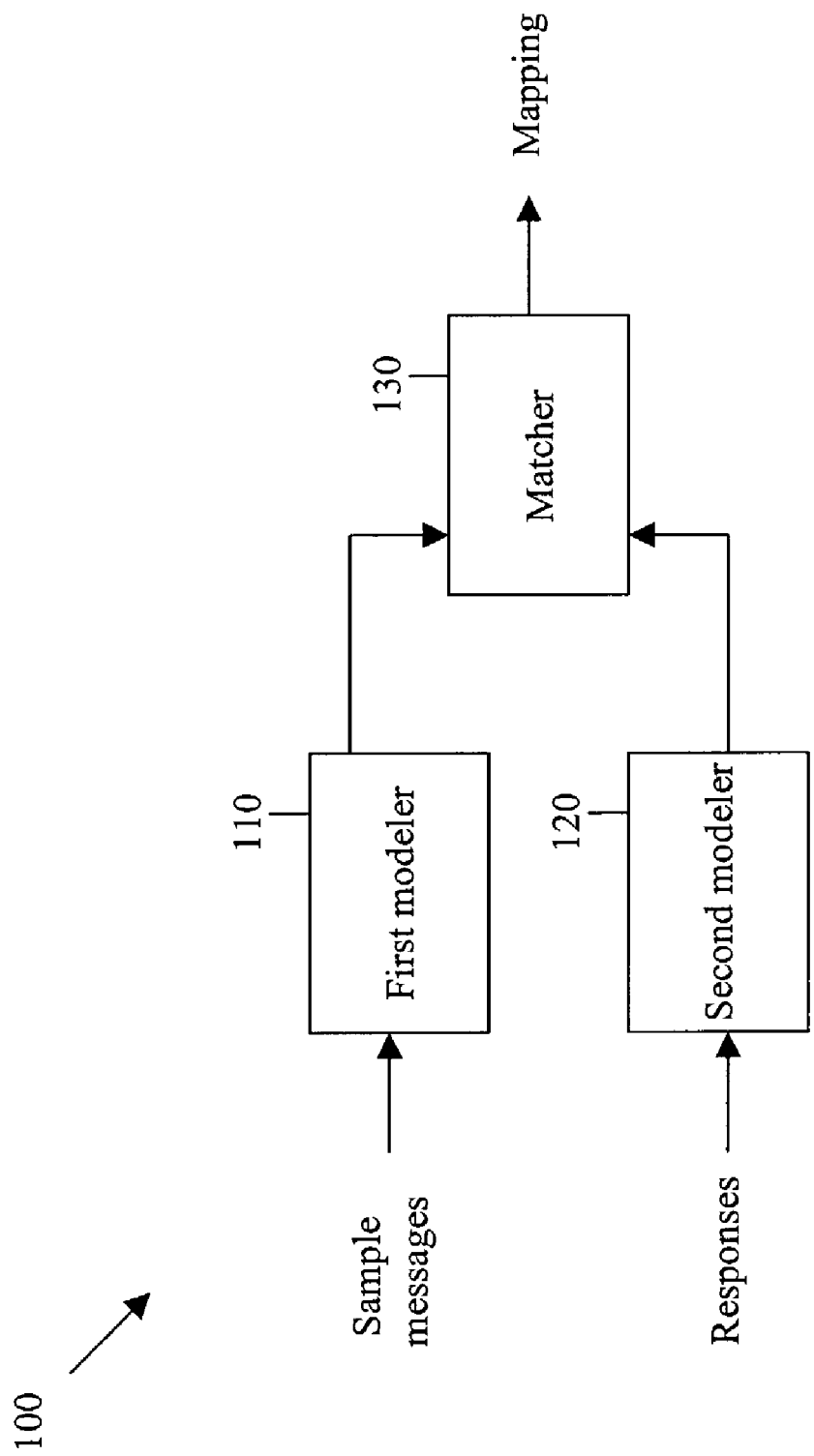
FIG. 1 is a simplified block diagram of a development environment for developing a data transfer interface, according to a preferred embodiment of the present invention.

In these times of rapidly developing direct system-to-system data communication, many industries still rely on methods such as telephone, mail, and fax for transferring information, due to incompatibilities between systems. Systems often differ in data content as well as data representation. If the systems are to communicate directly, such incompatibilities must be resolved. An interface mediating between different systems can solve these difficulties. However, for an interface to be an effective solution, other difficulties must be avoided. The interface should work with multiple technological platforms, and require minimal changes to existing systems. Additional costs, such as for personnel retraining, should be kept low.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified block diagram of a preferred embodiment, according to the present invention, of a development environment 100, for developing a data transfer interface. The development environment assists a user in creating an interface whose function is to convert message traffic between sending and receiving data systems. The sending and receiving data systems have a first data structure (or format) and a second data structure (or format) respectively. The development environment is used to develop mappings between the data structure. The mappings may subsequently be used by the interface, to transform messages between the data structures.

Development environment 100 consists of a first structure modeler 110, a second structure modeler 120, and a matcher 130. The first structure modeler 110 automatically analyzes sample messages from the sending data system, where each sample message has a respective message type. Based on the sample messages, the first structure modeler 110 provides a model of the first data structure for each of the message types. Preferably, the first structure modeler 110 develops hierarchical models.

The second structure modeler 120 develops a model of the second data structure, by analyzing responses from the receiving system to test data, for each of the message types. The test data may be generated automatically, but it is currently easier to generate the data manually. The test data may take into account receiving system responses to earlier data. Preferably, the second structure modeler 120 also develops hierarchical models.

The matcher 130 uses the outputs of both structure modelers to develop a mapping between the data structures. The matcher 130 supports matching elements of the first data structure model to corresponding elements of the second data structure model. Some of the matching may be done automatically, but it is currently easier to perform the matching manually.

In the preferred embodiment, the second modeler 120 incorporates a definition of receiving system workflow into the second model. System workflow deals with issues such as how to access the correct screens or forms within the receiving system, and how to divide information included in a single incoming message for insertion into multiple forms within the receiving system. Workflow related aspects of the data structure can then be incorporated into the mapping by the matcher 130. The mapping may also resolve platform related issues, and provide the interface with handling capabilities for issues such as screen transitions, and form and cookie management.

Figure 2:
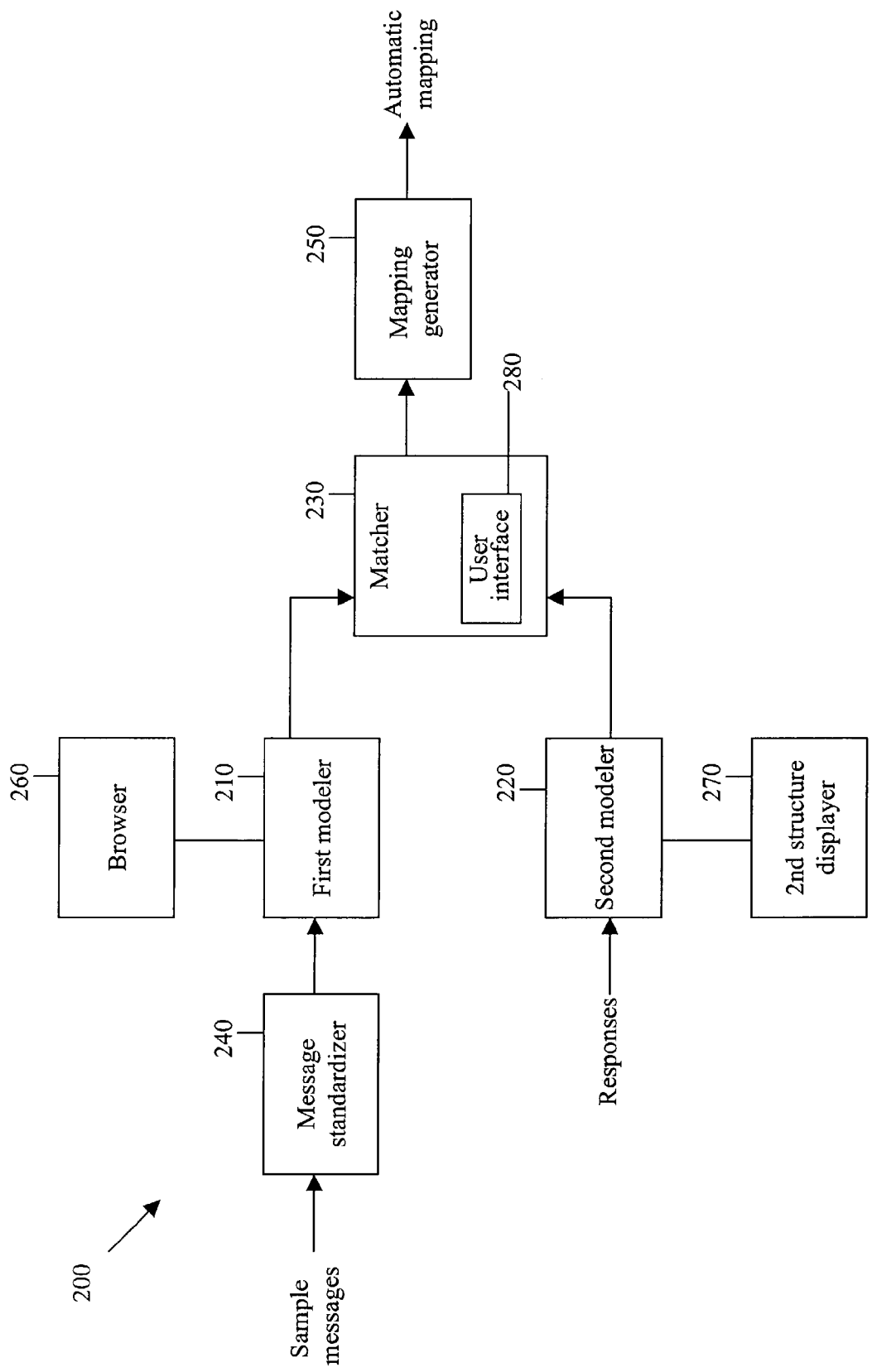
FIG. 2 is a simplified block diagram of a development environment, according to a second preferred embodiment of the present invention.

Reference is now made to FIG. 2, which is a simplified block diagram of a second preferred embodiment of a development environment 200, for developing a data transfer interface. The development environment 200 consists of a first structure modeler 210, a second structure modeler 220, and a matcher 230, which operate substantially as described above. Development environment 200 may also include one or more additional elements, such as the message standardizer 240, mapping generator 250, browser 260, second structure displayer 270, and interface 280.

In the preferred embodiment, the development environment contains a message standardizer 240, which converts the sample messages used by first modeler 210 into a relevant standard structure. The standard structure can be an industry standard, such as extensible markup language (XML), a structure developed for similar types of requests, or an intermediate structure defined for the development environment. The first structure modeler 210 then forms the first structure model from the standardized sample messages output by message standardizer 240. Working with an intermediate standard format may be particularly effective when the receiving system data structure essentially conforms to the standard structure, with extensions or modifications particular to the receiving system.

The development environment preferably also consists of a mapping generator 250 at the matcher output, for generating a mapping from the matching and other information provided by the matcher 230. The function of the mapping generator 250 is to provide instructions for automatically converting a message from the first data structure into the second data structure. Preferably, the mapping is represented in a transformation language (TL), which expresses cross-system rules and logic. An example of a transformation language is presented below.

In the preferred embodiment, mappings in the transformation language are compilable into augmented Service Provider Extensions (SPX+) files. Standard Service Provider Extensions (SPX) provide the ability to tailor a standard XML specification to the unique requirements of a service provider. (The insurance industry standard, for example, is ACORD SPX.) SPX+ extends SPX by introducing information for (user-assisted) completion and correction of the XML data stream. Examples of SPX+ definitions are given in Appendix 1.

The development environment 200 may also include tools to display information to a user, and to facilitate user control of the development environment 200. Browser 260 displays information about the sending system and its data structure. The development environment 200 may also have a second structure displayer 270, which displays information about the second data structure, and the data expected by the receiving system for a given message type. The second structure displayer 270 provides the user with information about terminal screens, web forms, and files. The second structure displayer 270 displays information gathered by the second modeler 220, by analysis of receiving system responses to identify fields, repetitions (groups), locations, and available values. Receiving system workflow information may also be displayed, for both the visual interface (entered data) and the internal system (screens transitions, cookies management, etc.). The information presented by both the browser 260 and the second structure displayer 270 may be displayed hierarchically.

Preferably, development environment 200 also contains a user interface 280 within the matcher 230. The user interface 280 displays the first and second structure models, and enables a user to monitor and perform the matching between the two models.

An implementation of a development environment platform is now presented. The platform develops data transformation services. These services define the process of data transformation for specific business processes, for use by an interface facilitating traffic between data systems.

Figure 3:
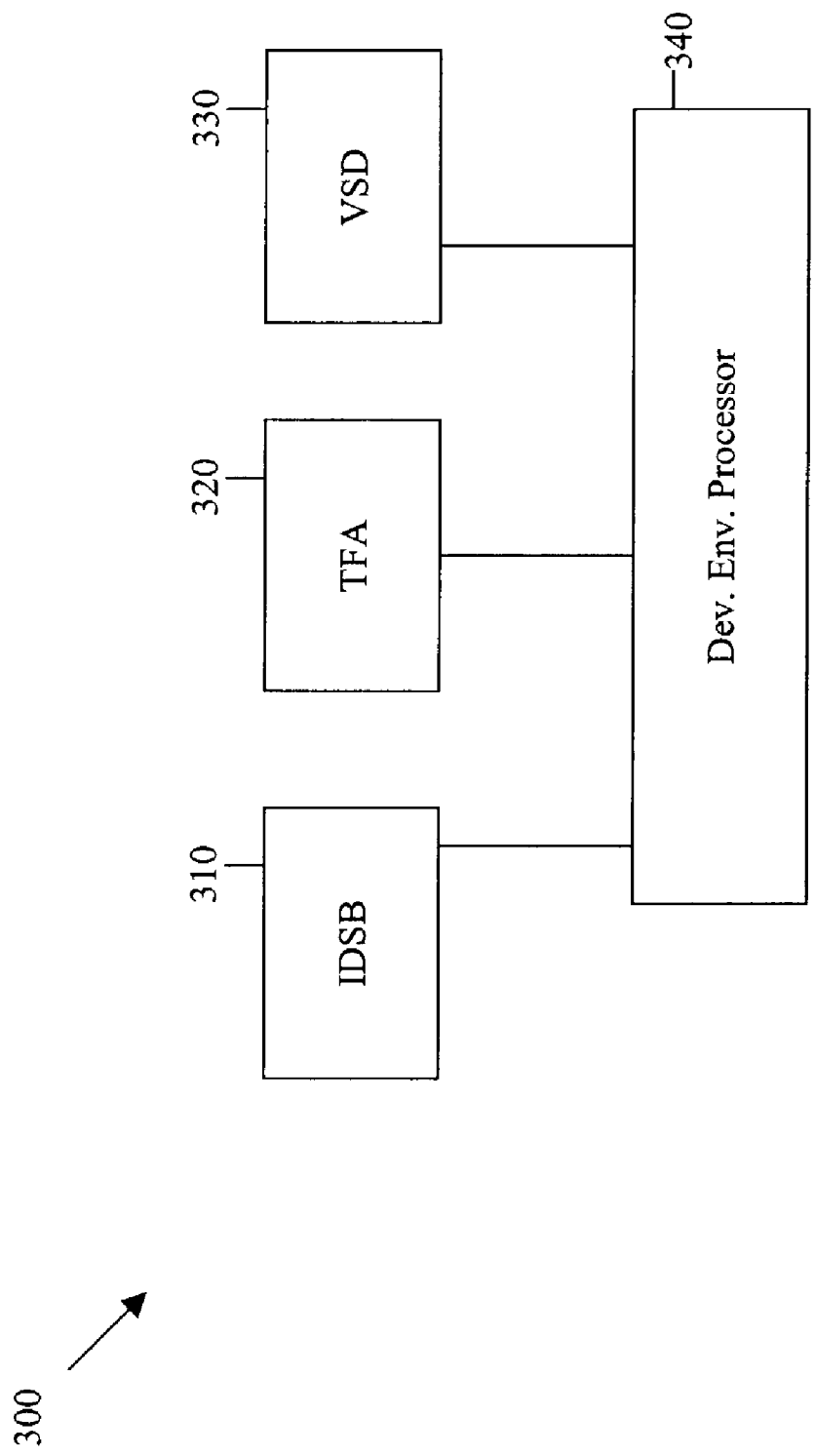
FIG. 3 shows primary stages of data transformation service development.

Reference is now made to FIG. 3, which is a simplified block diagram of a preferred embodiment of a development environment platform. The development environment platform 300 consists of several user tools, including the Input Data Smart Browser (IDSB) 310, Target Format Analyzer (TFA) 320, and Visual Service Designer (VSD) 330, and a development environment processor 340.

The IDSB 310 presents the data received from a requesting (sending) system on top of the standard relevant XML format. The data is presented in a hierarchical layout, with additional information (at all levels) instantly available. Several options may be selected for inserting data into the relevant XML format. The available input data options include: message data, a missing data entry form dynamically created to display required data, target system data, and system internal data.

The TFA 320 shows the target-expected data (terminal screens, web forms, and files), obtained after analysis of fields, repetitions (groups), locations and available values. The platform interrogates the receiving system, either automatically or manually, to learn the workflow of both the visual interface (for entered data) and the internal processes (screens transitions, cookies management, etc.).

The VSD 330 is a graphical tool for manual matching between available input data to target screens. The VSD 330 displays transformation service information, and provides a visual control center for designing the service. Any combination, manipulation, and logical expression of the data objects can be graphically defined.

The development environment processor 340 processes the information collected, both automatically and by manual input via the IDSB 310, TFA 320, and VSD 330, into data transformation services.

Figure 4:
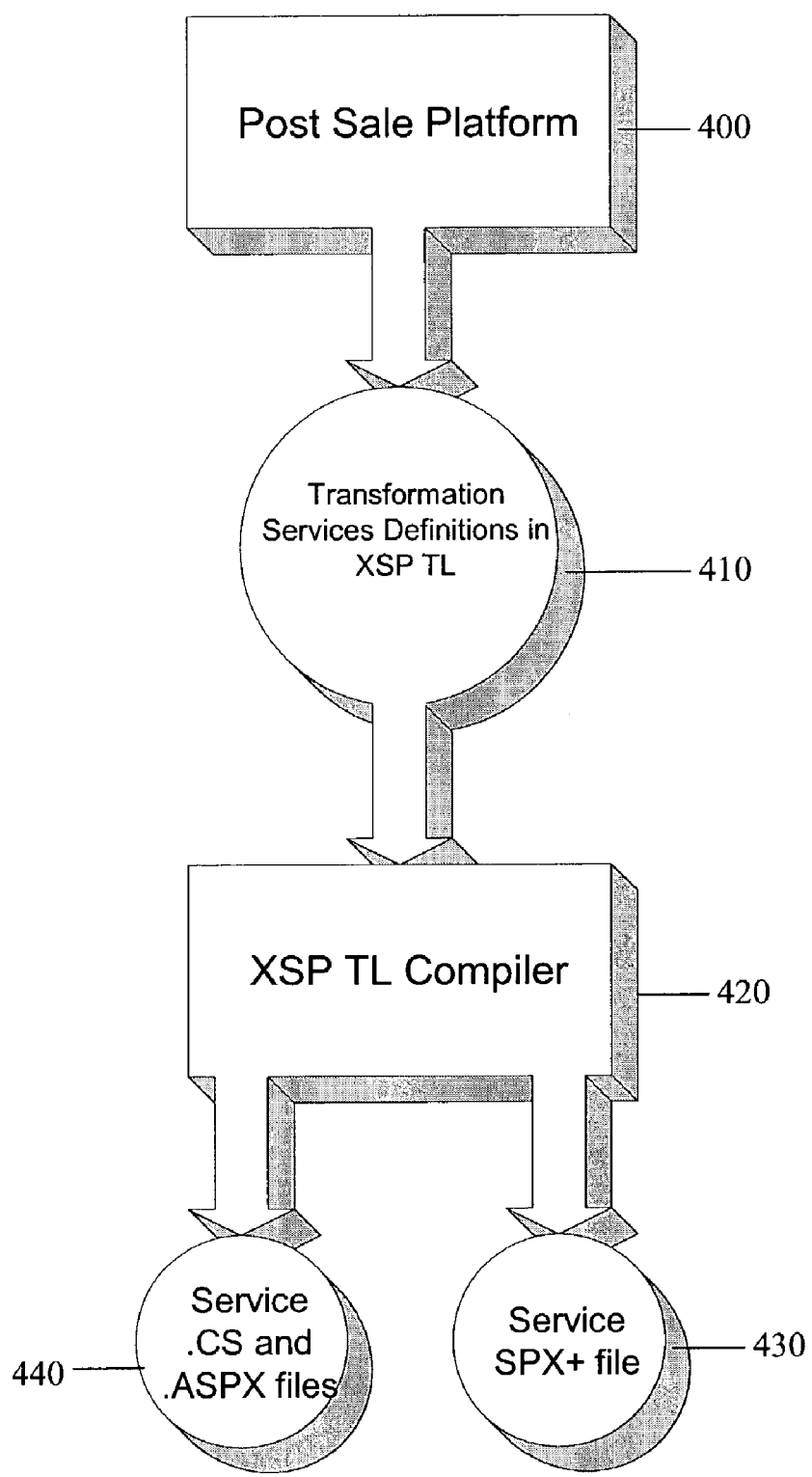
FIG. 4 is a simplified block diagram of an interface for transforming a data message structure from a first data structure into a second data format, according to a preferred embodiment of the present invention.

Reference is now made to FIG. 4, which is a simplified diagram that illustrates stages of data transformation service development by a preferred embodiment of the development environment platform 400. When a sample file is received from the requesting system, the relevant standard XML format is selected. The relevant format is determined by the associated business process. The standard format for each business process and/or message type may be an industry standard, or a special purpose format designed for platform use. The sample file is translated to the selected XML format. The resulting file generally conforms only partially to the standard, due to incomplete sample file information.

Independently of the sample file transformation, information is gathered about the target (receiving) system. The target system's screen information is saved to the platform, using the High Level Language Application Program Interface (HLLAPI) for accessing terminal screen information, or HyperText Markup Language (HTML) for web form information.

The development environment platform 400, which uses class-based object-oriented programming, generates an instance for each screen, group, and field using the Composite.Service class (which contains all basic classes including Screen, Group and Field classes). Groups of data are detected by looking for repetitions of field location and size. The Composite.Service class also provides the classes for screen transitions and cookie management.

The matching and mapping between the standard XML and the screens is performed using the VSD. The target can be mapped to any combination of data from standard XML, process/target/requestor/user specific data, target data, or system internal data, provided the relevant input data options were selected for the IDSB.

The mapping information is next encoded and stored using what is known as a transformation language. As shown in FIG. 4, the mapping at this stage is expressed as transformation service definitions 410 expressed in the transformation language. The transformation language used by this implementation is an XML-based language developed specifically for the purpose of mapping between systems. The transformation language enables easy representation of cross system rules and logic. Further details of a sample transformation language are described in Appendix 2.

The TL Compiler 420 compiles the transformation language definitions 410 to produce data transformation services. The services consist of SPX and/or SPX+ definition files 430, as well as .ASPX (Active Server Pages ) and .CS (C Sharp) files 440. The SPX+ definitions describe special requirements of a specific requested (receiving) system, and the way to transform standard XML request data to meet these requirements. The SPX/SPX+ files contain all the information for an interface to use to produce a valid standard XML for submission. ASPX and CS files define a specific service structure. The .CS and .ASPX files 440 contain all the information for the submission of a valid standard XML message to the target.

The pointers to the SPX, SPX+ files are linked (using a database) to the specific process, target, requestor, or user. Finally, the .ASPX and .CS files are compiled by the NET framework™ into executable format.

The HTTP object may serve as an example of how the transformation language represents platform related behavior. The HTTP object was built to process HyperText Transfer Protocol (HTTP), mainly by emulating the browser's fetch operation, and thus encapsulating HTTP relevant behaviors. Two main behaviors are handled: cookie handling and form treatment.

The HTTP object handles cookies in the same way as an Internet browser. The HTTP object collects all the cookies returned by the various target responses, and sends the cookies only when necessary, that is only to the relevant target. The Cookies mechanism is internal to the HTTP object, and has no user interface.

Unlike the Cookies mechanism, the Forms mechanism is intended to supply an interface between the host's response and the form posted to the user. The function of the Forms mechanism is to build the list of forms contained in the host's response. The fields of these forms can then be accessed by the user, and, finally, a form can be posted generating an HTTP request with all data included in the form's fields.

As part of the encapsulation conception used for the HTTP object, all HTTP related behaviors are treated under a single class, which is called WebRoutines. Web pages may be used at two stages: at the service design stage for mapping between platforms, and for transmission to the target (gateway) when the service is active. At the service design stage, compatibility is achieved using information obtained from web pages. The WebRoutines class supplies functions that allow for fetching of pages, without concern for cookies being passed. In addition, the WebRoutines class holds an object which enables the user to get a form, based on an html page.

Additional HTTP behaviours are incorporated into the HTTP object in accordance with accepted standards.

The development environment described above creates mappings between the data structures of differing data systems. For these systems to be able to communicate with each other, however, requires an interface. The interface resolves data structure differences between the systems, based on the mappings provided by the development environment.

Figure 5:
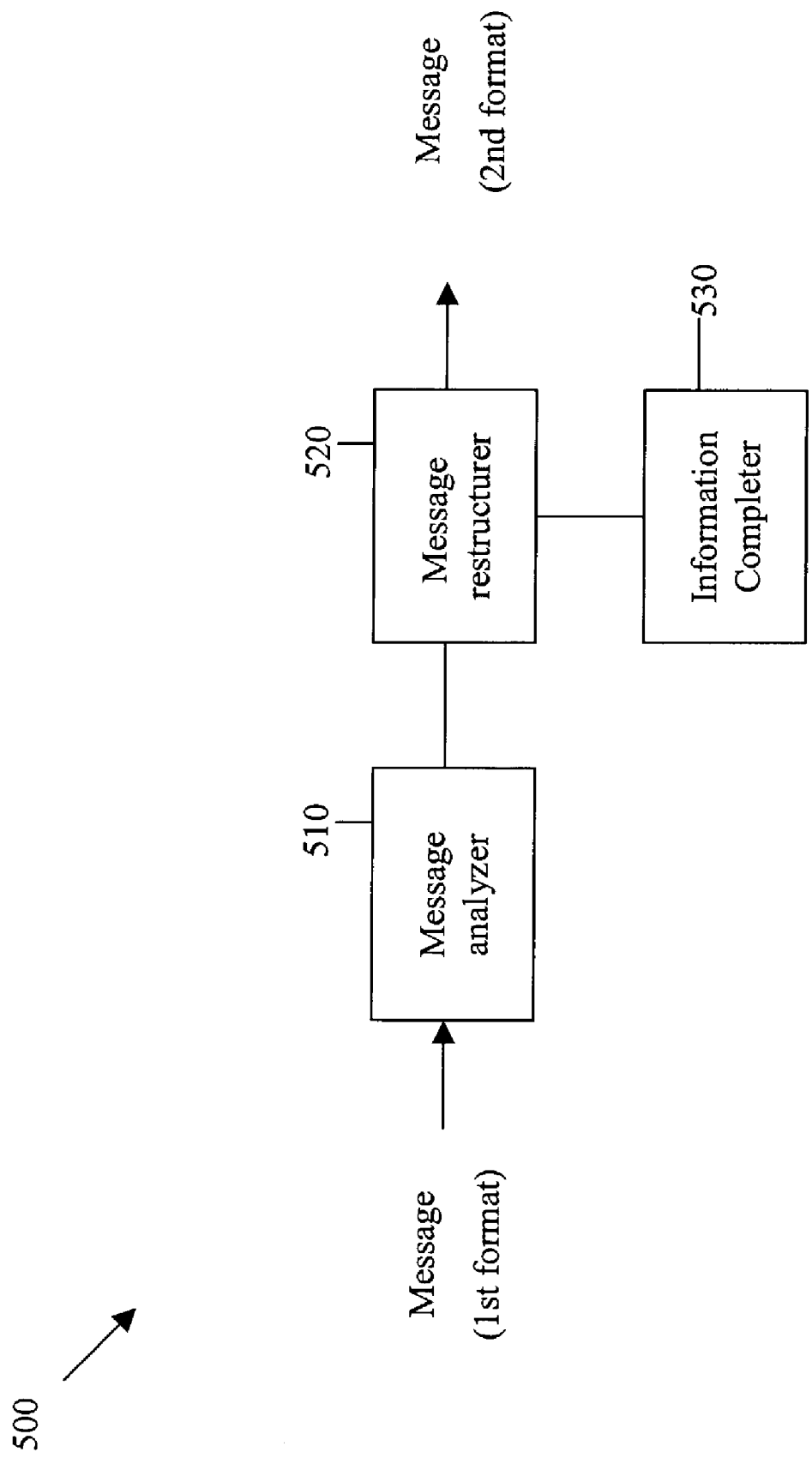
FIG. 5 is a simplified block diagram of a data structure transformation interface, according to a further preferred embodiment of the present invention.

Reference is now made to FIG. 5, which is a simplified block diagram of a preferred embodiment of an interface 500 for translating an initial data message from a first data structure into a completed data message in a second data format. In general, the first and second data structures are specific to a requesting and receiving system respectively, and do not conform to a standard or known format. Interface 500 consists of message analyzer 510, message restructurer 520, and information completer 530. Message analyzer 510 analyzes a data message from the sending system, and detects the message type. Message analyzer 510 then selects the appropriate mapping for the detected message type. If there are more than one sending and/or receiving system handling messages of the detected type, the message analyzer may also take into consideration the specific sending and/or receiving system. The mapping describes the specific processing that will be performed on the message in order to transform the message into the receiving system format. Message analyzer 510 may also test incoming message validity.

Message restructurer 520 uses the selected mapping to match data fields from the first message to the respective fields in the second data structure, and restructures the initial message to conform to the second message structure. In some cases the restructured message does not contain, at this stage, all the information required to form a message with the second message structure. If information is missing, information completer 530 queries the sending system to obtain the missing information. Once the missing information has been obtained, message restructurer 520 maps the missing information into the restructured message, which now complies fully with the receiving system structure.

Information required to convert messages from the first data structure to the second data structure may be specified by the mapping, or may be determined by analyzing the message. In the preferred embodiment, information completer 530 comprises a message inspector, which analyses the message to identify missing information.

In a preferred embodiment, interface 500 serves as a bi-directional interface. In this case, interface 500 has functionality to transform (or translate) the responses received from the receiving system in the second data format into messages conforming to the first data format.

In the preferred embodiment, interface 500 is able to resolve communication format differences between multiple systems. If an initial message from a sending system is to be sent to several receiving systems, restructurer 520 converts the initial message into the specific format of each of the receiving systems. Information completer 530 queries the sending system to obtain the missing information required by all of the receiving systems, so that the message is then converted into each receiving system's data structure.

Interface 500 enables intercommunication between systems, without requiring that any changes be made to either the requesting or receiving systems. The requirements of the receiving system for each message type are encapsulated in a set of rules in the interface. Preferably a separate processing path is selected within the interface 500 for each message type, to ensure that all the receiving system requirements are met.

Figure 6:
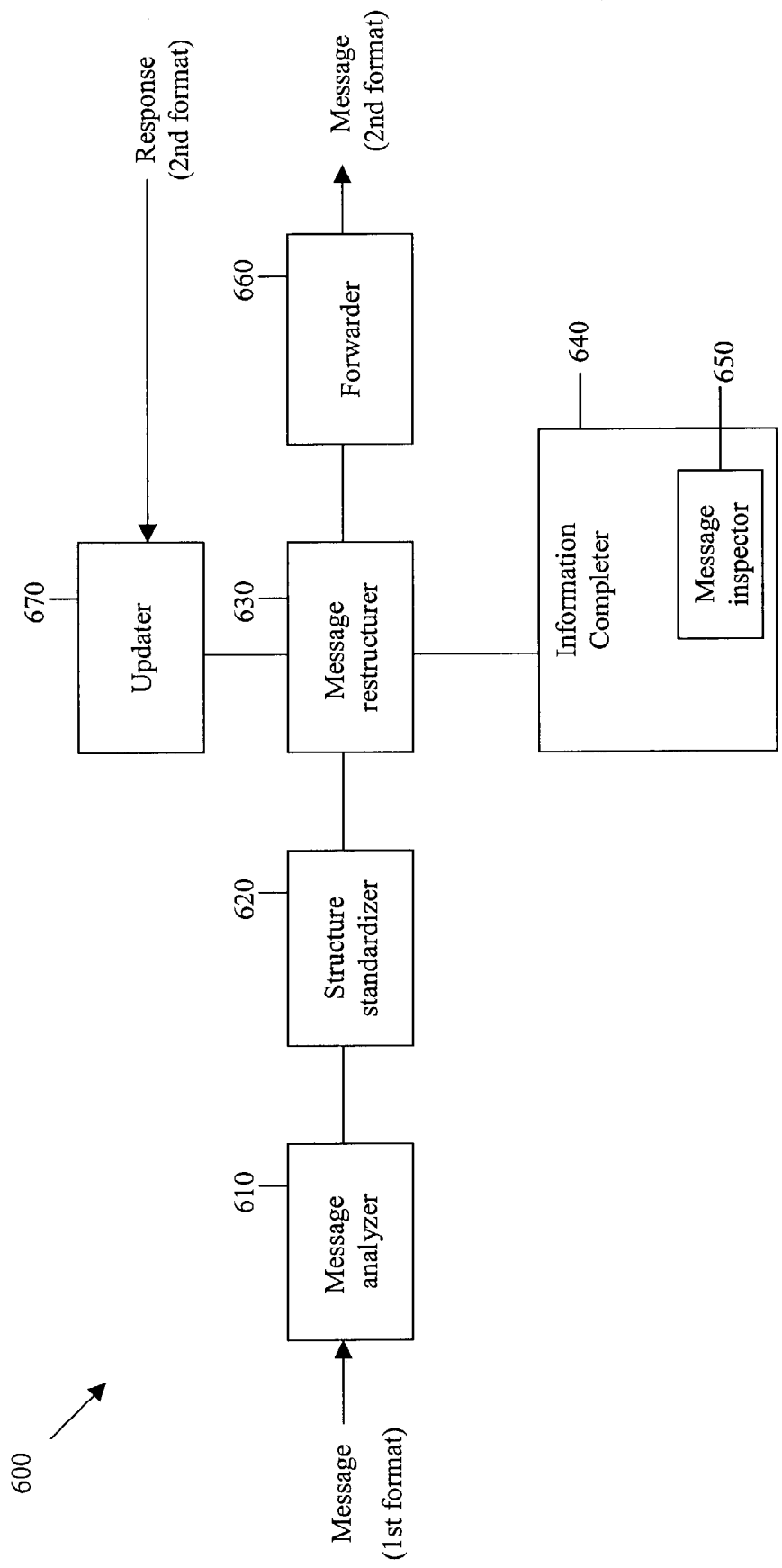
FIG. 6 is a simplified flowchart of a method for translating an initial data message having a first data structure into a completed message having second data structure, according to a preferred embodiment of the present invention.

Reference is now made to FIG. 6, which is a simplified block diagram of a further preferred embodiment of an interface 600 for translating a data message from a first data format into a second data format. In addition to the message analyzer 610, message restructurer 630, information completer 640, and message inspector 650 discussed above, interface 600 also consists of one or more of the following elements: structure standardizer 620, forwarder 660, and updater 670.

In the preferred embodiment, interface 600 also contains a structure standardizer 620 which converts the initial message into a standard structure. Typically, the sending system and/or the receiving system comply with a general structure, such as extensible markup language (XML), with the addition of system specific extensions to the standard. Thus converting the incoming message into standard form is a convenient intermediate step. The standardized message, however, generally will not be acceptable to the receiving system, since it will be missing any target requirements beyond the standard structure. The information completer 640 can analyze the standardized message to determine missing information, which may be easier than analyzing the initial message directly. When the information completion process is completed, message restructurer 630 maps the standardized message into a completed message in the second data structure. When the interface 600 utilizes a standard intermediate structure, the mapping describes the transformation between the initial structure and the standard structure, and the transformation between the standardized message and the second data structure.

Interface 600 preferably also contains a forwarder 660. Forwarder 660 forwards the completed message to the receiving system(s). Forwarder 660 may also forward receiving system responses to the sending system, after they have been converted to the sending system data structure. In the preferred embodiment, forwarder 660 selects a gateway to transmit the message (or response) according to a number of criteria. These criteria include: target (or requesting) system, message type, gateway and session availability, and performance history. The forwarder 660 may also perform gateway state management to ensure minimal state transition overhead on the receiving systems.

In the preferred embodiment interface 600 also contains an updater 670. The updater 670 monitors all responses from the receiving system to identify changes in the receiving system, and modifies the mapping to accommodate these changes. For example, if for a given message type the information required by the receiving system has changed, the updater determines the additional information now required, and modifies the mapping accordingly.

Interface 600 may also contain an activity logger, which logs all relevant interface activity in a log.

Figure 7:
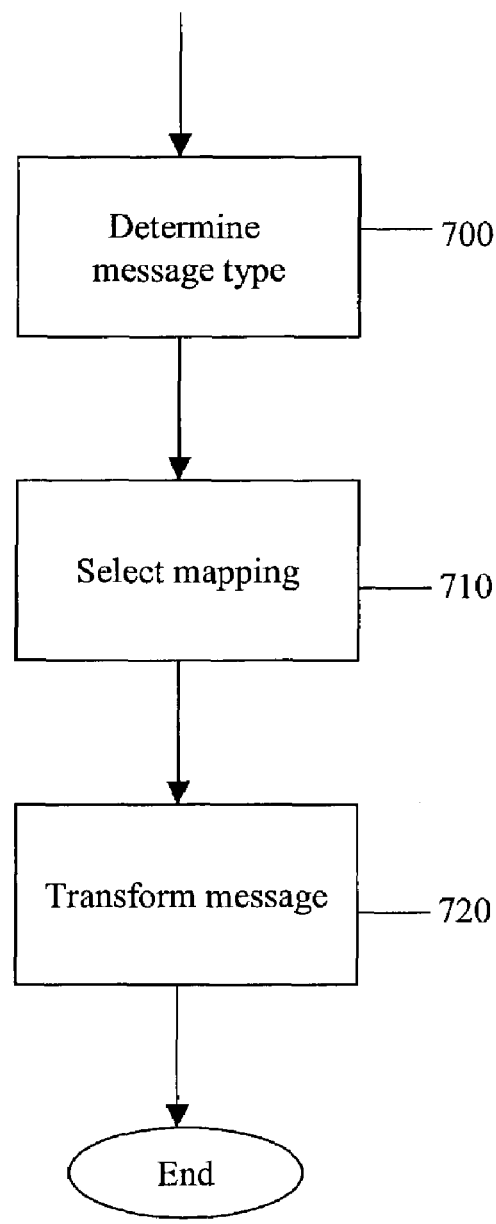
FIG. 7 is a simplified flowchart of a method for transforming a data message having a first data structure into a completed message having second data structure, according to a second preferred embodiment of the present invention.

Reference is now made to FIG. 7, which is a simplified flowchart of a method for translating an initial data message from a sending system, having a first data structure, into a completed message having a target specific second data structure, according to a preferred embodiment of the present invention. In step 700 a message type of the initial message is determined. A mapping is selected in step 710, taking into consideration the message type and, in relevant cases, the sending and receiving systems. In step 720, the initial message is transformed into a message conforming to the second data structure, as specified by the mapping. The process may be performed multiple times on a single message, with the relevant mappings, when the message is destined for more than one receiving system.

Figure 8:
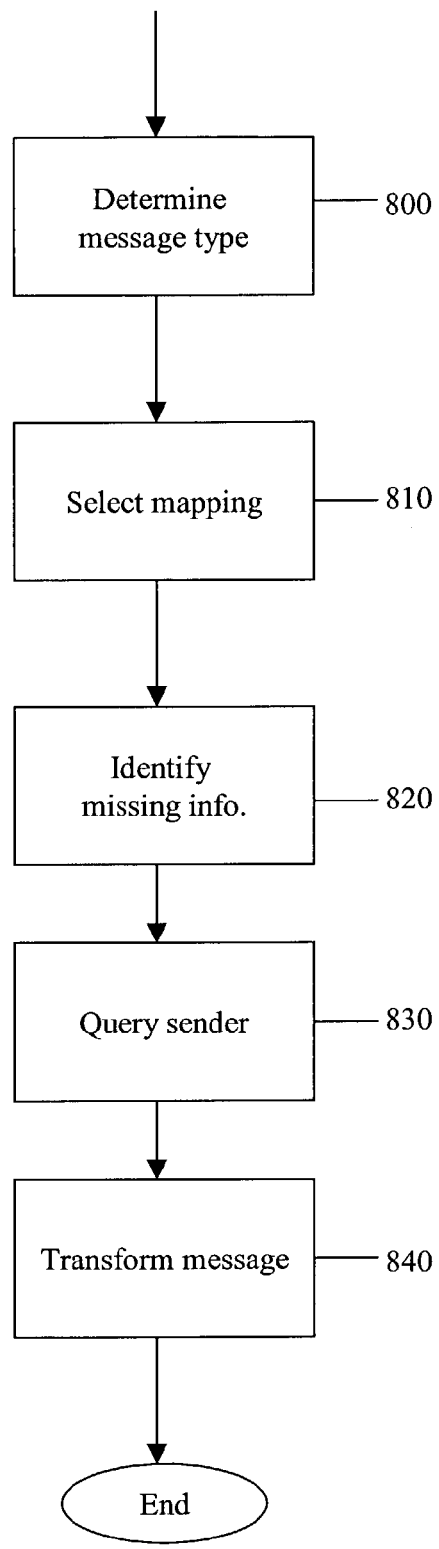
FIG. 8 is a simplified flowchart of a method for updating mappings to accommodate changes to the receiving system's data structure, according to a preferred embodiment of the present invention.

Reference is now made to FIG. 8, which is a simplified flowchart of an alternate preferred embodiment of a method for translating an initial data message from a first data structure, into a completed message having a second data structure. Steps 800 and 810 correspond respectively to steps 700 and 710 of the method of FIG. 7. In step 820, information required by the first data structure and absent from the message is identified. The missing information is generally specified by the mapping, but analysis of the initial message may be required. In step 830 the sending system is queried to provide the missing information. Then, in step 840, the initial message is transformed into a completed message as defined by the mapping, using the information obtained by querying the sending system.

Preferably, the method further includes forwarding the completed message to the receiving system. The method may also include transforming receiving system responses to the message into the first data structure, and forwarding the transformed response back to the sending system.

In the preferred embodiment, the method includes the further step of converting the incoming data message into a data message in an intermediate (or standardized) structure, for example a structure partially conforming to the receiving system structure. Further message processing is then performed on the intermediate standard message.

Figure 9:
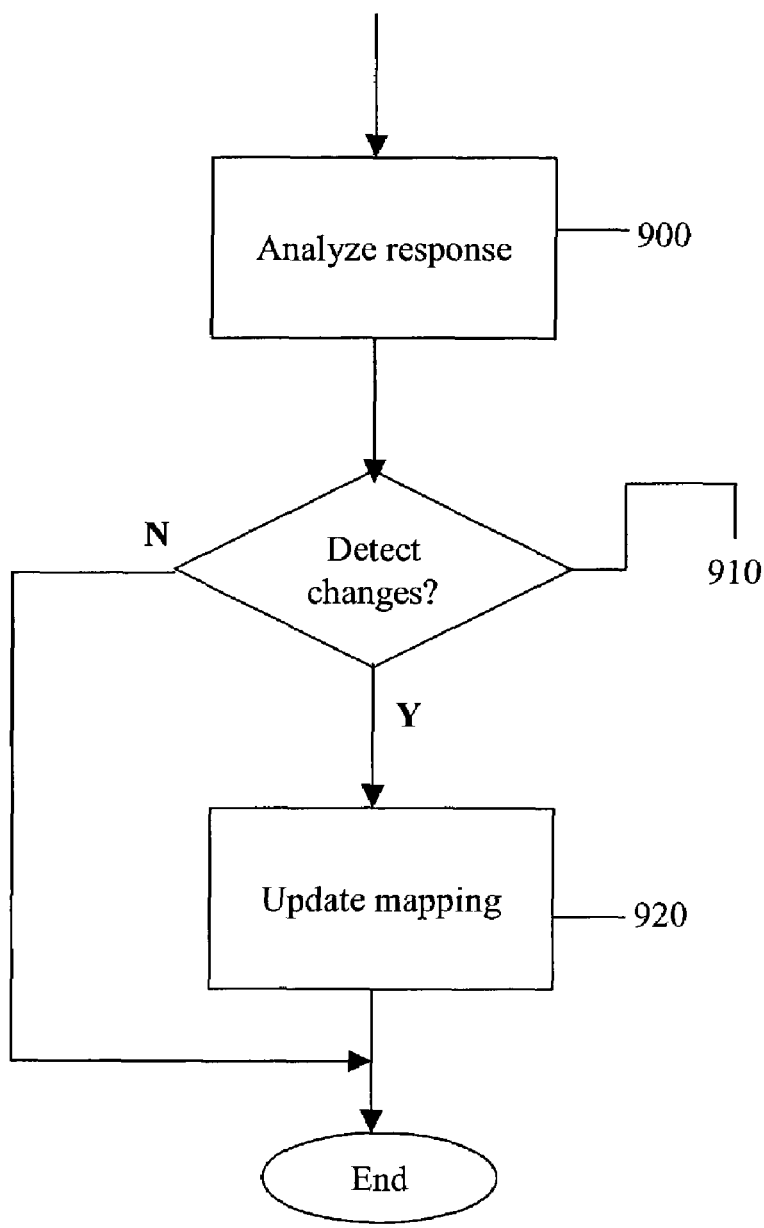
FIG. 9 illustrates interface processing of an incoming request.

Reference is now made to FIG. 9, which is a simplified flowchart of a preferred embodiment of method for updating mappings to accommodate changes to the receiving system's data structure. In step 900 the receiving system responses to a message from the sending system are analyzed. If changes are detected in step 910, the relevant mapping is updated accordingly in step 920.

Following is a description of a server-based, XML implementation of the interface described above. In general the interface operates as follows. Incoming requests are directed to a server. The server activates an appropriate service path to transform information in both directions. (A service path is a string of processes which implement the mapping, so as to automatically transform a request into the desired data structure and submit the transformed request to the correct receiving system.) By undergoing the service path processing, the request is transformed into the receiving system format, and sent to the receiving system. The target response to the transformed request is received and processed by the server and sent to the sending system. The results and a trace of the transaction are written into a log database. The interface system thus provides independent, transparent real-time communication. A closed set of independent system modules can enable transparent, real-time communication for most types of requests and receiving systems.

Figure 10:
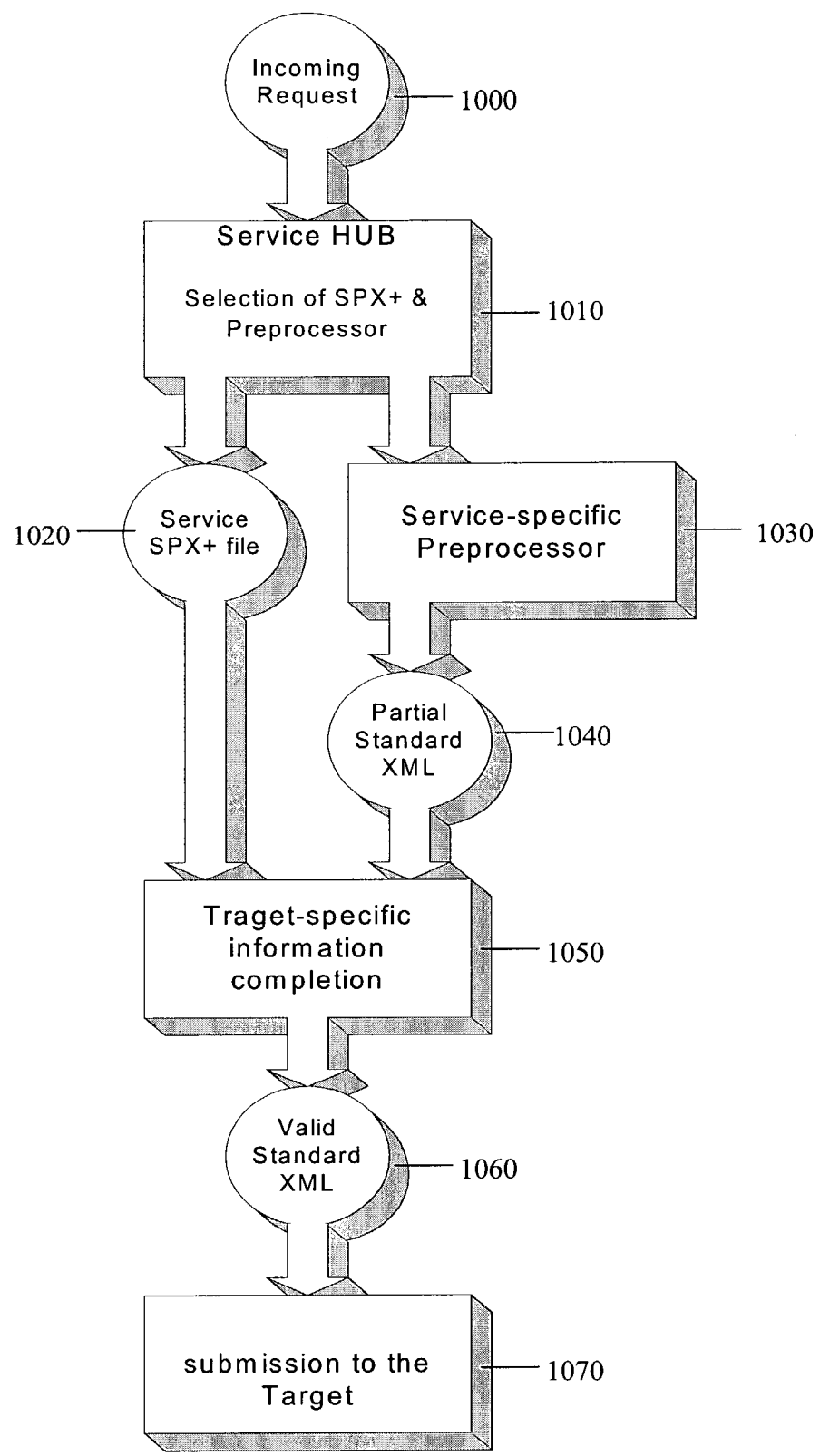
FIG. 10 shows how initial request data is transformed into a standard extensible markup language (XML) format.

Reference is now made to FIG. 10, which shows interface processing of an incoming request 1000 in more detail. Incoming requests are accepted by a hub 1010. To ensure correct processing, each incoming request is handled by an appropriate service path. The hub preferably tests the request validity and selects a service path 1020. The hub 1010 then redirects the request to the chosen service path.

The first process in the service path is the structure standardizer, which acts as a service specific preprocessor 1030. The structure standardizer's mission is to automatically transform requests to a standard relevant XML format 1040. Different processes use different XML structures, thus the relevant standard format is dependent upon the target system and the request type. At this stage the XML data file may be only partially compliant with the standard receiving system format, due to lack of necessary information in the incoming request.

The next step is information completion 1050. The purpose of the information completion step is to ensure that the XML file complies fully with the requirements of the target system. The request is checked against both standard and target-specific requirements to ensure that all information is present. If the request involves multiple requested systems, compliance is checked against all requested systems. If information is missing, an Additional Information (AI) form is presented to the user for gathering necessary data. The SPX+ file defines the processes for performing validity testing upon the message, and for building the AI form. The user completes the missing information, and returns the form to the interface. After the necessary information is received, a valid standard XML data request 1060, complying with target system requirements, is generated.

The valid standard relevant XML data file is routed to the appropriate service within a submission module. The submission module sends the information to the target system (or systems) 1070. The submission module uses a selected gateway, which serves as a service-independent connector to the target system, to transfer information to and from the target.

The gateways are preferably implemented as Microsoft® NET Remote Objects, whose function is to encapsulate communication with different target systems (usually host systems). Communication can be done in different ways, such as through High Level Language Application Program Interface (HLLAPI) terminals (for mainframes), HTTP classes (for web sites), or by other means. Gateways differ in the type of host(s) they support, but all gateways share the same exposed interface (web methods). Gateways support communication with multiple carriers and concurrent transfer of multiple requests (sessions).

Gateway selection is a process of choosing a gateway capable of communicating with the appropriate carrier. The gateway selection process is initiated after fetching the request header for the target system, and taking into account the request type, gateway and session availability, and performance history. (The request header contains information about the target system and the request type.)

The submission module also performs gateway state management. Gateway state management is a mechanism to ensure minimal state transition overhead on the target systems. The state management mechanism records the connection type utilized for previously performed business processes, and attempts to use the same connection for future similar business process and not for other types of processes.

For example, if the most recent process performed in a specific gateway was logging in to a carrier terminal and fetching billing information, the last state of this gateway is the billing screen. If the next task is billing for the same carrier, then minimal state transition is achieved by using the same gateway to fetch the new billing information.

Another function of the submission module is to monitor target responses to submitted requests. The submission module detects recent changes to the target system that have not been addressed by the interface, and updates the interface modules accordingly. If the target requests new information, the request for the additional information is relayed back to the requester, and an appropriate dynamic screen is generated requiring the user who submitted the request to enter the additional data for entry. Moreover, the appropriate interface SPX, SPX+ definition is changed, in order to automatically require the additional data in further requests.

When a response is returned to the interface from the target, the response is reformatted by the interface to conform to the sending system's format. The response is then sent to the requestor by the submission module.

Figure 11:
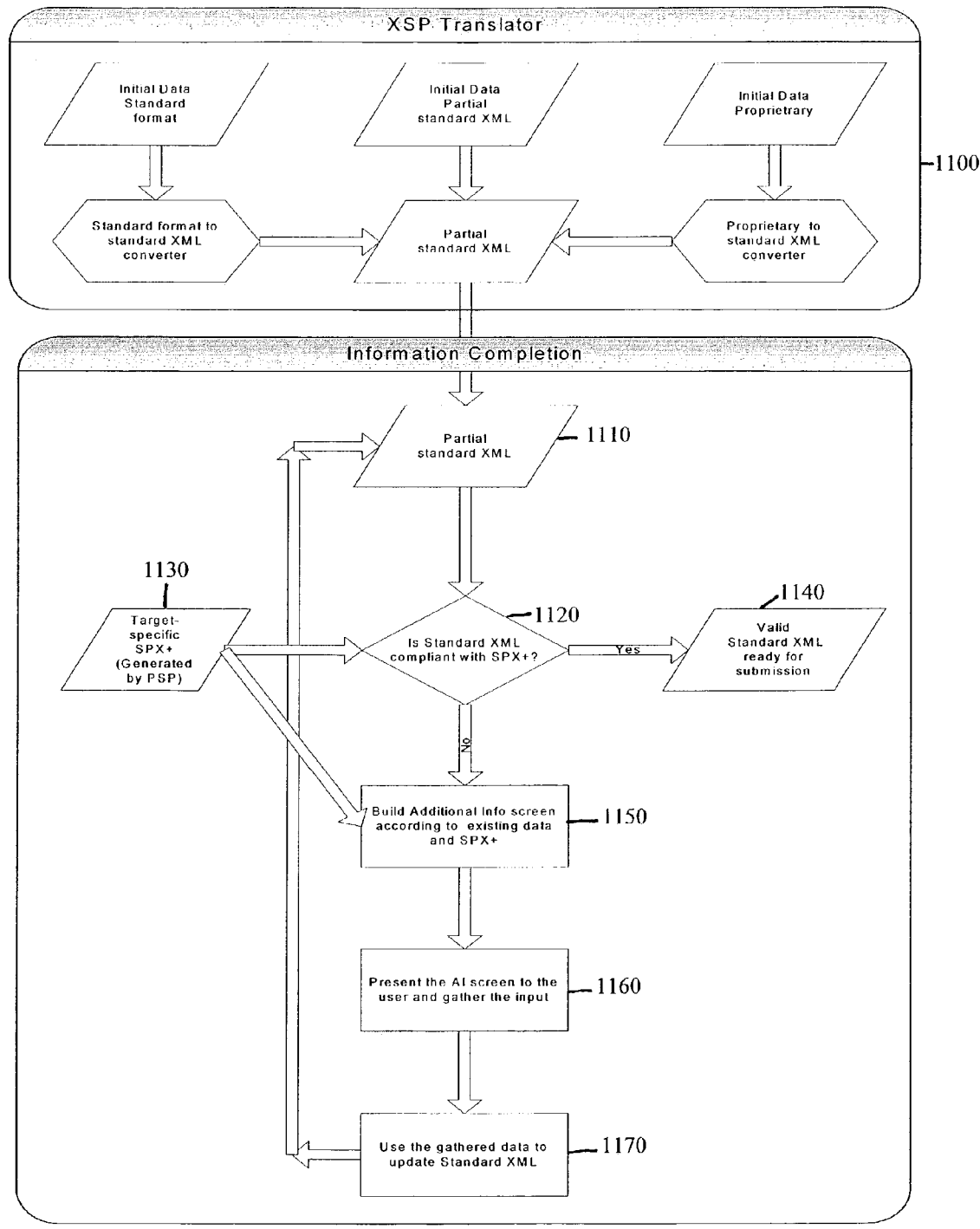
FIG. 11 is a simplified flow chart illustrating how initial request data is transformed into the standard XML format and or requester proprietary format.

Reference is now made to FIG. 11, which is a simplified diagram showing how initial request data is transformed into the standard XML format required by the target system. The initial data in the request may be in standard format, partially standard XML format, and/or requestor proprietary format. In the translator phase 1100, all three of these structures are translated into a (partial) standard XML format. In the information completion phase, an iterative procedure is performed to convert this partial standard XML data to the standard XML format required by the target system. The partial standard XML 1110 is checked in step 1120 to see if it complies with the target standard, using the interface's target specific SPX+ definitions 1130. If the request is in the valid format, the request may then be ready for submission to the target system 1140. If not, an AI screen (form) is built by the interface in step 1150, and presented to the requesting user in step 1160. When the additional data is received, the new data is used to update the request to increase conformance to standard XML in step 1170. The reformulated request is then rechecked in step 1120. The process continues until the standard format is obtained, and the request is submitted to the target.

An example of an industry which can benefit from the interface embodiments described above is the insurance industry. An interface is needed to seamlessly connect insurance parties without changing any of their existing systems, even if they were not originally designed with connectivity capabilities. The embodiments presented herein are multi-platform, enabling connection between different types of systems, and therefore carriers using mainframe, legacy, Unix, or Microsoft® Windows systems can be quickly connected without any system changes. Insurance agencies can continue to work with their existing management systems regardless of the type of software or hardware they have. The time and costs of connecting the two parties are a fraction of those of a full-scale e-business project, while the cost reduction in automating processes is immediate and easy to calculate, yielding a quick ROI.

Systems differ not only by data representation, but also by the content. The information completion process ensures that the sending system is queried only once to provide any missing information. Double entry of data is avoided and efficiency is increased.

A particular advantage of the interface solution is that no change to existing systems is required, to either the sending or receiving system. The parties are preferably connected relatively quickly, and may avoid lengthy, expensive, and complicated IT projects. Only a data or Internet connection is required. There is a reduced need for additional IT staff or resources, thus minimizing IT maintenance costs.

In the insurance industry, preferred embodiments of the interface enable insurance agents and carriers to communicate in real-time using their existing systems for both submitting and receiving information. Processes that may once have taken hours, days, or weeks (e.g. real-time carrier quotes, endorsements, claims, policy submissions and inquiries) can, using preferred embodiments of the present invention, be completed within seconds. Since there is no change to the existing systems themselves, there is no compulsory system downtime, a reduction in the need for expensive IT resources/personnel, and no employee training is generally not required.

Using a structure interface according to the present embodiments, insurance companies (carriers) can reduce the costs of data entry and paper processing, and can easily add new agencies having different data systems. There is no need to teach the new agent the carrier's proprietary systems and forms. Insurance agencies, brokers, wholesalers and producer groups can provide better service to their customers, and eliminate multiple-entry of data, with the consequent dangers of omissions and errors. Banks offering insurance products and third-party service companies (e.g. medical providers, appraisers) can access relevant policy information from outside organizations with incompatible data formats, consequently reducing administrative costs. Insurance web sites and marketplaces can access direct carrier information (e.g. real quotes) and transact with insurance carriers online, again despite the presence of incompatible data systems. Finally, insurance software vendors (e.g. agency management software) can provide value-added services (e.g. real-time data) to their installed base of insurance customers. Customers can get up to date policy and claim information, as well as online quotes, immediate processing of new business applications and policy endorsements directly from their management system.

An interface providing automatic data structure transformation provides users with the ability to seamlessly transfer information between dissimilar IT systems. The development environment ensures that developing such an interface is a relatively quick and efficient task. Both standard (such as XML) and proprietary data structures can be used to communicate between the systems. The embodiments described above do not require changing existing systems, do not require integration projects, and require almost no cooperation from the IT departments of the parties. The solution is multi-platform and highly scalable, so that additional parties with different or incompatible technological platforms can be easily added.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

Appendix 1

This appendix contains information on the features and elements of an augmented SPX (SPX+). SPX+ provides the ability to tailor a user interface designed to complete and correct the information in an ACORD XML file according to a specific SPX file.

1. SPX+ Main Aggregates

| Tag | Type | Usage | Description |
| --- | --- | --- | --- |
| <Extension> | Aggregate | Optional Repeating | As used here, contains the list of relevant GUI fields |
| <Category> | Aggregate | Optional Repeating | As used here, defines a GUI category |
| <List> | Aggregate | Optional Repeating | As used here, defines a list of values for GUI fields. |
| <Field> | Aggregate | Optional Repeating | As used here, contains the definition of the GUI field |

1.1 Extension Aggregate <Extension>

The <Extension> aggregate defines a list of fields related to a certain SPX element defined in an attribute of the aggregate. The GUI fields <Relevant Field> are relevant only if certain conditions <ConditionExpr> are met.

| Tag | Type | Usage | Description |
| --- | --- | --- | --- |
| <ConditionExpr> | C-infinite | Optional | An XPath expression that establish the applicability of the associated fields. This expression is not restricted and can refer to an arbitrary number of fields. |
| <RelevantField> | Aggregate | Required Repeating | Contains an attribute that holds the Field reference. Must contain the relational Path of the data need to be edit. |

1.2 Field Aggregate <Field>

The <Field> aggregate defines the GUI field that may appear to the user in order to edit an ACORD XML file. The aggregate contains two attributes that hold the aggregate Id and a reference to a GUI category <Category>. The aggregate contains a list of context paths <ContextPath> to ACORD XML data that will be edited by the user.

The aggregate contains the prompted text <PromptText> and the data mask needed to validate the user input <DataMask>

| Tag | Type | Usage | Description |
| --- | --- | --- | --- |
| <ContextPath> | C-infinite | Optional Repeating | An XPath expression that establish the data need to be edit in the ACORD XML file. |
| <PromptText> | C-255 | Required | Text to name appropriately the GUI field. |
| <DataMask> | C-255 | Optional | Defines the format of data to be keyed into this field and permits the display of prompting characters within the keying area. Example: Drivers License-annn-nnnn-nnnn |
| <HelpText> | C-255 | Optional | Text to explain the user how to fill in the GUI field. |
| <Width> | | Optional | Width of the textbox on screen |
| <DefaultValue> | C-255 | Optional | The default value |
| <CodeListName> | C-255 | Optional | Name of a code-list (defined in SPX) with legal values |
| <Validations> | Aggregate | Optional | List of client-side validations |

1.3 Category Aggregate <Category>

The <Category> aggregate defines the GUI category that may appear to the user, holding sub-categories and prompted fields. The aggregate contains two attributes that hold the aggregate Id and a reference to a parent category (optional). The aggregate contains a title for the category <TitleText>. The aggregate can define a listed sequence of fields by a context path, an index <Indexer>, and a title for each iteration in the list <IterarionText> and <IterationFullNameText>.

| Tag | Type | Usage | Description |
| --- | --- | --- | --- |
| <ContextPath> | C-infinite | Optional | An XPath expression that establishes the data in ACORD XML file needed for indexing a list of fields, and to title them. |
| <TitleText> | C-255 | Required | Text to explain the user about the category. |
| <Indexer> | | Optional | |
| <IterationText> | C-255 | Optional | Text to explain the user about the list iterations. |
| <FullNameText> | C-infinite | Optional | Text created from the data in ACORD XML file to explain about the current iteration to the user. |

1.4 List Aggregate <List>

The <List> aggregate defines an array of values and titles for a GUI field. For example: a list of states codes. The aggregate contains an attribute holding the aggregate Id. As used here the aggregate contains a context path <ContextPath> that indicates the node that holds the values and titles. The aggregate contains two tags that define the elements in the list <ElementValue> and <ElementName>.

| Tag | Type | Usage | Description |
| --- | --- | --- | --- |
| <ContextPath> | C-infinite | Required | An XPath expression that indicate the node in SPX or SPX+ file that holds the values and titles for the list. |
| <ElementValue> | C-255 | Required | An XPath expression that defines the data needed for the value of the element in the list. |
| <ElementName> | C-255 | Required | An XPath expression that defines the data needed for the title of the element in the list. |

1.5 Example

SPX+ provides a mechanism for extending SPX. The following example illustrates an SPX+ modification of an SPX rule. The SPX rule is denoted "Total Exposure", and asserts that the total exposure must be a positive integer, when the nature of business is MFR, CONTR, or WHSLR.
<EditDefinition id="TotalExposure">
    <ContextPath>
/ACORD/InsuranceSvcRq/BOPPolicyQuoteInqRq/Location[position ( )<=3]/Total Exposure
    </ContextPath>
    <ConditionExpr>
count(/ACORD/InsuranceSvcRq/BOPPolicyQuoteInqRq/
    CommlSubLocation/BldgOccupancy/NatureBusinessCD
    [.="MFR" or .="CONTR" or .="WHSLR"])>0
    </ConditionExpr>
    <FieldAssertionExpr>
number(.)>0   and   round(number(.)*100)=(number(.)
    *100)
    </FieldAssertionExpr>
</EditDefinition>
SPX+extends the "TotalExposure" rule by listing one relvant field, "fieldTotalExposure", for cases in which the current value of the total exposure is less than or equal to zero.

<Extension SpxRuleRef="TotalExposure">
    <ConditionExpr>number(.)<=0</ConditionExpr>
    <RelevantField FieldRef="fieldTotalExposure"
    IsErroneous="Yes">
        <Help Text>Enter a positive number</HelpText>
    </RelevantField>
</Extension>

Next, SPX+ defines a mandatory field, "fieldTotalExposure", in the "categoryLocation"category. The "fieldTotalExposure" field is labeled "Total Exposure" and is 150pt in width.
    <Field id="fieldTotalExposure" name="TotalExposure"
    CategoryRef="categoryLocation" ListRef="">
        <Width>150</Width>
        <PromptText>Total Exposure</PromptText>
        <DefaultValue>0</DefaultValue>
        <Validations>
            <Validation>Mandator4y</Validation>
        </Validations>
    </Field>
Finally, the following code defines the location category.
    <Category   id="categoryLocation"   name="Location"
    repeating="Yes">
        <TitleText>Location</TitleText>
        <LabelText>Location</LabelText>
        <ContextPath>
        /ACORD/InsuranceSvcRq/BOPPolicyQuoteInqRq/
            Location
        </ContextPath>
        <Indexer>Location</Indexer>
        <OrderNumExpr>
            count(preceding-sibling::Location)+1
        </OrderNumExpr>
        <FullNameText>travelers:LocationString(.)</FullNameText>
    </Category>

Appendix 2

The example of a transformation language described below is an XML-based language, denoted XSP, TL, XSP TL is used to describe a process of automatic data transformation between parties (for example, between an agency management system and an insurance carrier's mainframe). XSP TL code is preferably generated by the development environment platform. The development environment platform described above is a visual tool, so no direct editing of XSP TL is required.

XSP TL is preferably tightly connected to the internal structure of classes in the development environment platform. These classes are used to load and save XSP TL definitions, update them and to produce the CS and ASPX files that actually perform the service. A completed service definition is used to produce a set of CS and ASPX files that actually perform the service.

Each node in the data transformation service tree of the development environment platform has a class behind it, which supports all its methods. A service tree is a hierarchical, tree-like representation of the class structure of the data transformation service. All the class nodes inherit from the same interface, thus asserting a ceertain way of implementation to all the descendants. The base class declares all the main methods, and the descendants preferably implement those method in different ways.

Another important issue of the data structure is the hierarchy of the nodes. Every node in the service tree implements some part of the hierarchy. For example, the service node class holds an arraylist of screens, and can delete/add them. The service node is also responsible for calling the correct methods of the screen nodes it holds. If the service calls its own LoadFromXML, the method is also responsible for iterating through the ArrayList of screens, and for each screen calls the correct LoadFromXML.

Using the same hierarchy at every level, the service works in a very similar way in all the stages. If there is a Field node that holds some Sources (inputs for the field), then upon calling this Field's SaveToXML method, those sources will automatically be saved to XML too. Currently there are 20 classes representing tree nodes (and also representing XML TL objects). Several representative examples are presented below.

The first node in the tree is always a Service node. It holds all the screens, and implements the interface methods, such as ToXML( ), LoadFromXML( ), AddToTree( ), RemoveFromTree( ), etc. The most important method is the ToCSharp( ) method. It is an interface method (every descendant has its own implementation), and it is the one responsible for the CS code creation.

When choosing the "Generate CS code" option in the menus, the Service.ToCSharp( ) method is invoked. This method generates all the service related code, and then asks all its Screens (in the arraylist) to do the same. The Screen.ToCsharp( ) method, creates all the Screen related code, and continues calling the same method but of its own members (fields, groups, etc.).

The XSP TL design has the advantage of being able to add a new set of class to hold new nodes in the tree fairly easily. If a new case is encountered where there is a group that holds screens. All that is required is to implement such a class is to inherit from the base tag, and to implement the methods accordingly.

Deeper in the node classes are a Group node class and a Field node class. Inside the Field class, there are more classes, which describe what to do with the field. For instance, consider a Field containing two InputSubSource instances, where one of them is a Conststubsource, and one is an AcordXMLInputSubSource. These two sub sources each have a class behind them, and this means thast this Field has two input options. Usually the first one is checked to determine if it is empty, and the correct action is then selected. The main point is that both input sub-sources inherit from the same base class as the Fields, the Groups, the Screens, and the Service.

The main difference between the 4-5 main nodes and all the others is that upon generating the CS code the 4-5 main nodes create classes for themselves. The other nodes create methods in those classes to support the 4-5 main classes. Assume that a Validator class is added under a certain field. When the CS code is generated, the Validator.ToCSharp( ) method will not create a Validator class. Instead it will create a ValidateField( ) method in the Screen scope.

CS files Creation by the development environment platform

When a user user the 'Generate C# Code' menu, the system, asks for a new file, and starts compiling the XML transition language which holds the data of the current service into the file. The development environment platform first creates the basic CS file, which contains the 'using' directives (like "include"), which are basically hard-coded. The development environment platform then creates the first class, the Service class.

The service class is inherited from Composite.Service class, to reflect the specific service being worked on. The service class implements a couple of basic methods to run the service. The methods which the inherited service does not implement are implemented in the Composite.Service class.

The newly constructed service holds all the screens as its provate members, and pratcially all its methods. It iterates through those member (Screen), and calls their methods.

For example a send routine looks like this:
public override bool Send
{
  screen1.send ( );
  screen2.send ( );
  Etc'
}

The development environment platform is designed so that the programmer does not have to inherit every single class. Therefore most of the core methods sit in the SerivceScreen class. In practical terms such a design means that in order to override a method the programmer can just override the method in the Screen scope. Otherwise the programmer would have had to inherit an entire Field class, and then override the specific method.

After the new Service class is created, the system goes through all the screens and implements a Screen class for each of the service's screen. The screen class in inherited from Composite.ServiceScreen class. The screen class holds all the core of the service. The screen is responsible for loading the fields, transforming the fields' data, validating the fields' data. Finally the screen class is responsible for sending the fields' data to the exact locations on the terminal (or to the exact HtmlIds at the web browser, etc'), moving through to the next screens, etc..

For each Field in a screen, the system genjerates an instance line in the Screen's Ctor:

M_userName=new Field ("Terminal", 1, 6, false);

Furthermore, for each Field, there is a series of Screen methods generated, like LoadField, TransformField, etc. The screen holds the methods, which call the Field's methods.

The group object is also handled within the Screen. When a group occurs, the screen tells the group to do something (like to Load its Fields), and the group is responsible to Load the Field it holds.

The group holds a big table, which points to its Fields, for each instance. For example, consider a group of drivers:

| #   | Name   | Surname      | Address    | Age | Gender |
|-----|--------|--------------|------------|-----|--------|
| #1  | Joseph | Coolio       | Bizo 5 st. | 33  | M      |
| #2  | Zehava | Goldenblacht | Horkenus 9 | 19  | F      |

The group halds a table representation of all the Drivers from the input file (in AL3, ACORD XML, etc.).

After creating the generated Service, the programmer can override most of the created methods, and inherit from all the classes (including the Service itself). The programmer can customize the general created service to meet the final needs.

We claim:

1. A development environment platform for developing a data transfer interface, for converting message traffic between a sending data system having a first data structure and a receiving data system having a second data structure, the environment platform comprising:

a first structure modeler for providing, from at least one sample message of each of a predetermined group of message types, a first data structure model for each of said message types;

a second structure modeler for developing, from second system responses to test data, a second data structure model for each of said message types; and a matcher associated with said first structure modeler and said second structure modeler, for supporting matching of elements of said first structure model to corresponding elements of said second structure model thereby to form a message type mapping;

wherein said message type mapping allows the data transfer interface to query said sending data system to provide information required by said second data structure and absent from said at least one sample message.

2. A development environment platform according to claim 1, wherein said second modeler is operable to incorporate, into said second model, handling capability for handling receiving system workflow.

3. A development environment platform according to claim 2, wherein said handling capability includes capability for handling cookie management.

4. A development environment platform according to claim 2, wherein said handling capability includes capability for handling form management.

5. A development environment platform according to claim 1, wherein said first structure modeler is operable to develop models in hierarchical form.

6. A development environment platform according to claim 1, wherein said second structure modeler is operable to develop models in hierarchical form.

7. A development environment platform according to claim 1, further comprising a message standardizer for converting sample messages into standardized messages having a standard structure associated with a respective message type.

8. A development environment platform according to claim 7, wherein said standard structure comprises an extensible markup language (XML) structure.

9. A development environment platform according to claim 7, wherein said second data structure comprises said standard structure and a receiving system specific structure.

10. A development environment platform according to claim 1, further comprising a mapping generator associated with said matcher, for generating mapping for automatically converting a message having said first data structure to a message having said second data structure.

11. A development environment platform according to claim 10, wherein said mapping generator is operable to represent said mapping in a transformation language.

12. A development environment platform according to claim 11, wherein said transformation language comprises cross-system rules and cross-system logic.

13. A development environment platform according to claim 11, wherein said mapping being in said transformation language is compilable to form an augmented Service Provider Extensions (SPX) file.

14. A development environment platform according to claim 1, further comprising a browser for displaying information received from said sending system to a user.

15. A development environment platform according to claim 14, wherein said information is displayed hierarchically.

16. A development environment platform according to claim 1, further comprising a second structure displayer, for displaying information expected by said receiving system for a selected message type.

17. A development environment platform according to claim 1, wherein said matcher further comprises a user interface for displaying said first and second models, and enabling a user to perform said matching.

18. An interface for converting an initial data message, having a first data structure, from a sending system to a completed message having a receiving system specific second data structure, comprising:

a message analyzer, for determining a message type of said initial message and selecting an appropriate mapping, said mapping being specific to said message type and describing a transformation for said message type between said first structure and said second structure; and an information completer, for querying said sending system to provide information required by said second data structure and absent from said initial data message.

19. An interface according to claim 18, wherein said message analyzer is further operable to select said mapping according to said sending and receiving systems.

20. An interface according to claim 18, further comprising a message restructurer, for restructuring said initial message to conform to said second data structure, in accordance with said mapping.

21. An interface according to claim 20, further comprising an information completer, for querying said sending system to provide information required by said second data structure and absent from said message.

22. An interface according to claim 21, wherein said message restructurer is further operable to insert information obtained from said sending system into said restructured message.

23. An interface according to claim 20, further comprising a structure standardizer for converting said initial data message into a standard structure data message.

24. An interface according to claim 23, wherein said structure standardizer is further operable to verify that said standard structure data message complies with said standard.

25. An interface according to claim 23, wherein said standard structure comprises an XML structure.

26. An interface according to claim 23, wherein said mapping further describes a transformation between said standard structure and said second data structure.

27. An interface according to claim 23, wherein said message restructurer is operable to restructure said standard structure data message to conform to said second data structure.

28. An interface according to claim 18, wherein said information completer comprises a message inspector, for analyzing said initial message according to said mapping, to identify said absent information.

29. An interface according to claim 18, said mapping is formulated as an augmented Service Provider Extensions (SPX) file.

30. An interface according to claim 18, wherein said message analyzer is further operable to test message validity.

31. An interface according to claim 18, further comprising an updater for analyzing receiving system responses to said completed message, detecting changes to said receiving system, and updating said mapping as required by said changes.

32. An interface according to claim 18, further comprising a forwarder, for forwarding said completed message to said receiving system.

33. An interface according to claim 32, wherein said forwarder is further operable to forward receiving system messages to said sending system.

34. An interface according to claim 32, wherein said forwarder is operable to select a gateway for outputting said message to a network.

35. An interface according to claim 34, wherein said forwarder is operable to optimize gateway selection.

36. An interface according to claim 18, wherein said interface is further operable to convert receiving system messages from said second data structure to said first data structure.

37. An interface according to claim 18, wherein said interface is further operable to convert said initial data message to a completed message having a third data structure associated with a second receiving system.

38. An interface according to claim 18, further comprising an activity logger for recording interface activity in a log.

39. A method for converting an initial data message, having a first data structure, from a sending system to a completed message having a receiving system specific second data structure, comprising:
   determining a message type of said initial message;
   selecting an appropriate mapping, said mapping being specific to said message type and describing a transformation, for said message type, between said first structure and said second structure;
   transforming said initial message into a message conforming to said second data structure, in accordance with said mapping;
   identifying information required by said second data structure and absent from said message; and
   querying said sending system to provide said absent information.

40. A method according to claim 39, further comprising converting said initial data message into a standard structure data message.

41. A method according to claim 39, further comprising the steps of:
   analyzing receiving system responses to said completed message; detecting changes to said receiving system; and updating said mapping as required by said changes.

42. A method according to claim 39, further comprising forwarding said completed message to said receiving system.

43. A method according to claim 42, further comprising mapping receiving system messages from said second data structure to said first data structure.

44. A method according to claim 43, further comprising forwarding receiving system messages to said sending system.

45. A method according to claim 39, further comprising converting said initial data message to a completed message having a third data structure associated with a second receiving system.

* * * * *